US008683007B2

(12) United States Patent
Kashef et al.

(10) Patent No.: US 8,683,007 B2
(45) Date of Patent: Mar. 25, 2014

(54) SEAMLESS TRANSFER OF MEDIA STREAMS

(75) Inventors: Hooman Kashef, Coto De Caza, CA (US); Gene Sheridan, Palos Verdes Estates, CA (US); Ramanathan Subramaniam, Old Bridge, NJ (US)

(73) Assignee: SMSC Holdings S.A.R.L., Luxembourg (LU)

( * ) Notice: Subject to any disclaimer, the term of this patent is extended or adjusted under 35 U.S.C. 154(b) by 348 days.

(21) Appl. No.: 13/116,369

(22) Filed: May 26, 2011

(65) Prior Publication Data

US 2011/0295974 A1    Dec. 1, 2011

Related U.S. Application Data

(60) Provisional application No. 61/348,927, filed on May 27, 2010.

(51) Int. Cl.
G06F 15/16 (2006.01)
(52) U.S. Cl.
USPC .......................................... 709/217; 709/227
(58) Field of Classification Search
USPC ......... 709/217, 218, 219, 227–229, 230–237, 709/246–248; 707/609–623
See application file for complete search history.

(56) References Cited

U.S. PATENT DOCUMENTS

| | | | |
|---|---|---|---|
| 7,039,643 B2 | 5/2006 | Sena et al. | |
| 7,092,326 B2 | 8/2006 | Becker et al. | |
| 7,257,641 B1 | 8/2007 | VanBuskirk et al. | |
| 7,412,727 B2 | 8/2008 | Kim et al. | |
| 7,467,220 B2 | 12/2008 | del Val et al. | |
| 7,555,715 B2 | 6/2009 | Randall et al. | |
| 7,623,892 B2 * | 11/2009 | Hawkins | 455/556.1 |
| 7,630,781 B2 | 12/2009 | Chin | |
| 7,650,143 B2 * | 1/2010 | Jagadeesan et al. | 455/417 |
| 7,752,327 B2 | 7/2010 | Li | |
| 7,783,773 B2 | 8/2010 | Wu et al. | |
| 7,865,366 B2 | 1/2011 | Johnson et al. | |
| 7,877,497 B2 | 1/2011 | Kirkland | |
| 7,925,771 B1 * | 4/2011 | Ping et al. | 709/231 |
| 7,991,801 B2 | 8/2011 | Chen et al. | |
| 8,005,988 B2 | 8/2011 | Maes | |

(Continued)

FOREIGN PATENT DOCUMENTS

| | | |
|---|---|---|
| EP | 1796389 | 6/2007 |
| WO | 2010/019408 | 2/2010 |

OTHER PUBLICATIONS

International Search Report and Written Opinion in Application No. PCT/US2011/038137 dated Nov. 25, 2011, 8 pages.

(Continued)

*Primary Examiner* — Ruolei Zong
(74) *Attorney, Agent, or Firm* — King & Spalding L.L.P.

(57) ABSTRACT

The transfer of media transmitted from a media provider from a first rendering device to a second includes establishing a network connection between the media provider and the second rendering device based on a network location and session context information. A desired transmission duplication of the media is determined such that the duplication will prevent substantial interruption of the rendering of the media as experienced by a user listening to both of the rendering devices, and that desired transmission duplication is sent to both the first rendering device and the second rendering device. The transmission is continued from the media provider to the second rendering device.

16 Claims, 6 Drawing Sheets

(56) References Cited

U.S. PATENT DOCUMENTS

| | | |
|---|---|---|
| 8,019,200 B2 | 9/2011 | Ong et al. |
| 2001/0021998 A1 | 9/2001 | Margulis |
| 2002/0133247 A1* | 9/2002 | Smith et al. ............ 700/94 |
| 2006/0262221 A1 | 11/2006 | Yuasa et al. |
| 2007/0136488 A1* | 6/2007 | Cho et al. ............ 709/231 |
| 2007/0143801 A1 | 6/2007 | Madonna et al. |
| 2007/0192802 A1 | 8/2007 | Chen et al. |
| 2009/0055549 A1 | 2/2009 | Niwa et al. |
| 2009/0100495 A1 | 4/2009 | Manapragada et al. |
| 2010/0042702 A1* | 2/2010 | Hanses ............ 709/219 |
| 2011/0246566 A1 | 10/2011 | Kashef et al. |
| 2011/0289229 A1 | 11/2011 | Subramaniam |
| 2011/0304443 A1 | 12/2011 | Sheridan et al. |

OTHER PUBLICATIONS

International Search Report and Written Opinion in Application No. PCT/US2011/036219 dated Jan. 31, 2012, 23 pages.

International Preliminary Report on Patentability, Application No. PCT/US2011/038137, 12 pages, May 10, 2013.

"DCT3416 Quick Start Guide," Motorola, http://www.westmancorn.com/fileadmin/Storage/Support/DCT3416QuickStartGuide.pdf, 2 pages, ©2007.

* cited by examiner

SEAMLESS TRANSFER OF MEDIA STREAMS

CROSS-REFERENCE TO RELATED APPLICATIONS

This application claims priority to U.S. Provisional Application Ser. No. 61/348,927, filed May 27, 2010 the disclosure of which is incorporated herein by reference in its entirety.

FIELD OF THE INVENTION

In various embodiments, the present invention relates to the use of media devices and, in particular, to interconnected wireless media devices.

BACKGROUND

In recent years, consumer electronics devices that access, store and play various kinds of content (e.g., music, video, etc.) have become increasingly popular. Such devices include, iPods that download and store music and video, network-enabled storage drives that store data, music, and video, satellite radios, and digital video recorders (DVRs) that store a variety of entertainment programming. At the same time, wireless networks have also become common in many households. Many content sources such as iPods, storage drives, satellite radios, and DVRs are designed to share the content they receive and/or store with other media devices via a home network.

It is very common for a user to experience (e.g., view or listen to) networked digital media using a rendering device like a cell phone, personal computer ("PC"), portable music player, or other consumer electronics device. Typical rendering devices may access digital media from a variety of sources (e.g., broadcast radio, satellite radio, local memory, a local or remote network, or a player device) and play the media back locally or on remotely connected speakers.

When a user has already started a session to experience digital media and then decides to change the physical location of the rendering device and/or change playback to a new rendering device, the user has to stop experiencing their selected digital media for the duration of the change. For example, a user may be experiencing digital media using a networked audio/video receiver ("AVR") and then switch the playback to a cell phone in the same or other location or network. In these cases, the user has to stop the current playback session on the AVR and find the same digital media content on the new rendering device, restart the service or session, and fast forward to the same point in the playback as they were in the original session.

In effect, experiencing digital media is very much governed by the type and location of the rendering devices, even though multiple and capable rending devices may be available to a user.

Current media transfer methods are limited to the transfer of digital media originating (i.e., hosted) on a first networked device to a second networked device. For example, streaming digital media content that originates on a portable device may be transferred to a host device. These current methods, however, do not address the transfer of digital media from a first device to a second device wherein the digital media originates from a third media device (e.g., a media server or service). Furthermore, the current methods do not address the transfer of digital media content from a first device to a second device when the media content is streamed from a web-based server or service, whether such content is a media stream (for example, a radio station) or a finite media file.

In addition, existing network infrastructure makes seamless transfer difficult. The TCP/IP protocol suite, for example, is the basis for the networking infrastructure in the Internet. At the network layer, the Internet is viewed as a set of networks or autonomous systems connected together in a hierarchical manner. Internet Protocol (or "IP") is the mechanism that connects these networks together. Its basic function is to deliver data from a source to a destination independent of the physical location of the two. IP identifies each node uniquely, using an IP address that designates its physical attachment to the Internet.

IP decides the next-hop by determining the network information from the destination IP address of the packet. On the other hand, higher level layers like TCP maintain information about connections that are indexed by a quadruplet containing the IP addresses of both the endpoints and the port numbers. Thus, a seamless transfer a streaming session using TCP/IP networking from one media rendering device to another media rendering device faces many challenges. For example, the destination address in the packets comprising the streaming audio needs to be changed from the address of the original rendering device to the address of the new rendering device. Further, an existing TCP connection may rely on keeping the IP address the same to maintain the connection; changing the IP address in mid-stream may cause the connection to be disrupted.

In any case, existing methods do not transfer the media quickly enough to ensure an uninterrupted media experience for the consumer, nor do they address the need to synchronize the media rendering when multiple rendering devices are playing back the same content. Clearly, a need exists for a robust, adaptable way to transfer different kinds and sources of media to and from a wide variety of devices without stuttering and interruption.

SUMMARY

Embodiments of the present invention include a system, architecture, and method for the seamless transfer of digital media originating from a local or web-based media server or service from one networked rendering device to another networked rendering device. In various embodiments, the current invention transfers media to or from rendering devices on homogeneous or heterogeneous networks and across all types of networked rendering devices. In addition, the transfers occur with sufficient speed to ensure an uninterrupted media experience for the consumer. In one embodiment, a seamless transfer is accomplished by a collaboration between applications on the rendering devices and the media server to thereby transfer the session context while keeping the changes to the existing Internet infrastructure minimal and/or increasing transparency to the higher-level protocols, as described in greater detail below.

Accordingly, embodiments the invention provide methods for transferring a rendering of media from a first rendering device to a second rendering device based on media transmitted from a media provider. The method includes providing a network location of the second rendering device to the media provider and providing a session context pertaining to a network connection between the first rendering device and the media provider to the said second rendering device. A network connection is then established between the media provider and the second rendering device based on the network location and the session context. A desired transmission duplication of the media is determined such that the duplication will prevent substantial interruption of the rendering of the media as experienced by a user listening to both of the rendering devices, and that desired transmission duplication is sent to both the first rendering device and the second rendering device. The transmission is continued from the media provider to the second rendering device.

In some embodiments, the provision of the network location of the second rendering device is provided from the first rendering device. The provision may be provided in response to a trigger event. The trigger event may occur at the first rendering device or the second rendering device. Examples of trigger events include, for example, a user selection of a menu option, pressing of a button or switch on one of the rendering devices, and/or a signal strength indication falling below a desired signal strength threshold. Transmission of the media from the media provider to the first rendering device may be terminated after transmission of at the desired transmission duplication of the media.

These and other objects, along with advantages and features of the embodiments of the present invention herein disclosed, will become more apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DESCRIPTION

Figure 1:
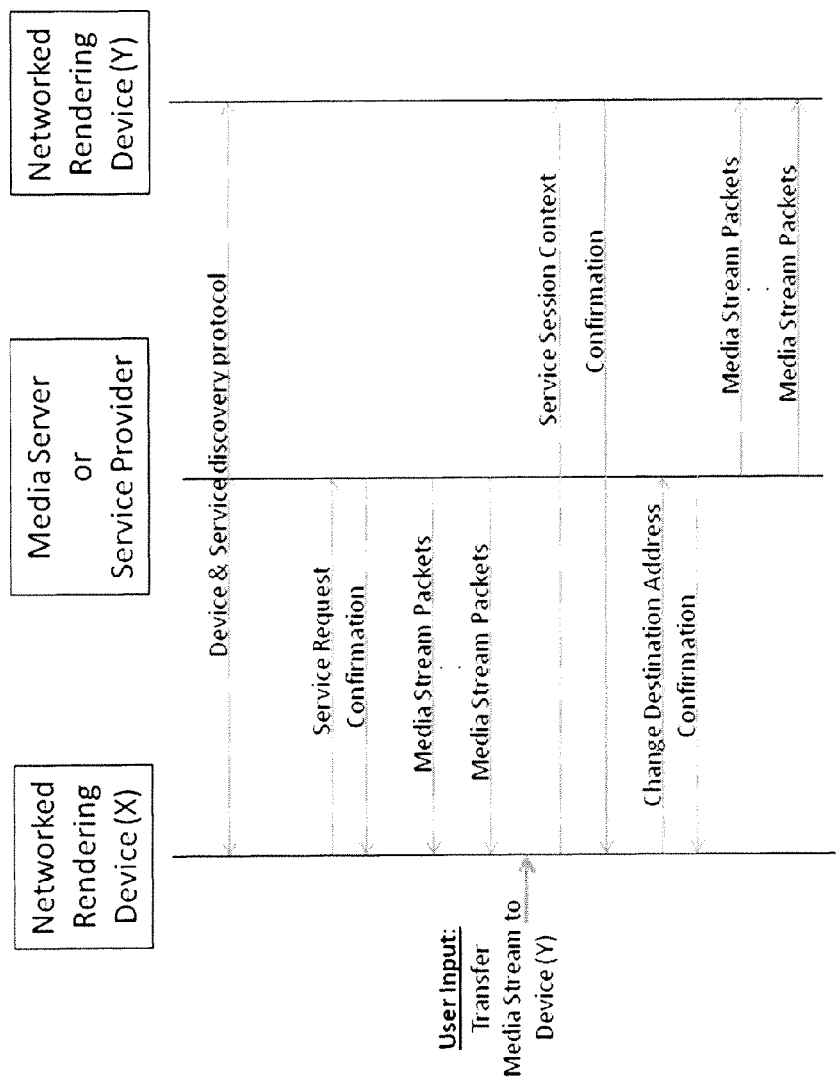
FIG. 1 is a data flow diagram illustrating a method for transferring a media stream among two rendering devices according to various embodiments of the invention.

In one embodiment, shown in FIG. 1, a networked rendering device is aware of the presence and service capability (e.g., the types of media rendering services and communication protocols supported) of at least one other network rendering device present on the network (either a home network or a publicly available WiFi network using known and/or appropriate IP addresses) using a discovery protocol. In addition to general connectivity, the protocol announces or discovers devices and identifies the service capability of each rendering device (e.g., one device capable of playing Internet Radio, AM/FM radio, and another device capable of playing from Airplay/iTunes and PC/Win7 server, etc). The discovery protocol may be based on publicly available protocols, such as uPnP or Bonjour, but the system may also work with proprietary discovery protocols. For example, the devices may periodically advertise their identity and the service capabilities to allow other devices learn about these devices and use the information. The proprietary discovery protocols may include a beaconing or self announcement mechanism, registration, authentication, naming convention, drop and add mechanisms and service capability announcements (eg: Radio services, codec and data rate capabilities, audio sampling rate, etc). A connection may be established between two devices—based on the information gained from the discovery process. In one embodiment, each networked rendering device is aware of the presence and capability of all the other rendering devices.

The first networked rendering device (e.g., Device (X)) requests and establishes a service connection to a networked media server (a local device) or a networked service provider (e.g., an Internet-based streaming service). In response, the media server or service provider begins streaming digital media to the rendering device. Device (X) may maintain information that uniquely identifies this particular session (e.g., a unique session ID) and/or all the accompanying connection and authentication data, referred to herein as "session context." This information may be generated locally by the rendering device and contain access information such as the IP address, account login and password, etc.

At some time later, the user may initiate a request to render the digital media on a different rendering device, e.g., Networked Rendering Device (Y). The request to transfer the rendering of the media may be initiated from either Device (X), Device (Y), or a network-based remote controller. For example, a remote controller enables to the user to interact with the ecosystem using a device like a smart phone, iPad or home computer. In some instances, the request may be initiated automatically by the device itself based, for example, on a signal strength indicator, power level indicator or other state information. For example, if a device recognizes that its power level is below 10%, or the signal strength of the wireless signal is below a minimum decibel level, the request may be initiated. Device (X) sends the necessary session context information to Device (Y). The session context information may reduce or minimize the transaction time and/or data flow between the media server or networked service provider required to establish a connection. In some instances, the server access data is available in one area and the device need not need to go through a protocol and set of exchanges to fetch the required access information.

Device (X) then informs the media server or networked service provider to route the streamed media packets to the new destination, Device (Y). Specifically, at the lowest layer—IP is used to communicate the information to the media server, although higher layer protocols such as HTML, JSON, and XML may be used. The destinations may be identified at the application level using logical names that are uniquely bound to IP addresses and ports that facilitate the switching at networking layer. At this point, the media stream is seamlessly transferred from Device (X) to Device (Y). This media transfer, using the proposed architecture, may occur in less than approximately 2 seconds. Generally, the media stream and playback continues with Device (X) until such time that Device (Y) is ready to initiate media playback, such that there would be little or no disruption to the continuous playback of the stream (e.g., any disruption lasts for less than approximately 100 msec). In some instances, the devices announce how much can and also how much audio data will be buffered before a playback session can start as part of their "discovery and service announcement" procedure. In some cases it is possible to bound the time taken to switch—and use the same to make the transfer seamless. Alternatively, it can be coordinated by the mediation entity (SMD)—which can continue streaming to the original device until it gets confirmation from the target device indicating that the transfer it complete. More specifically, the media server/service provider begins transmitting to Device(Y) even as Device(X) continues playback, as the media server/service provider determines the transmission time for its connection with each device, thereby allowing the calculation of the proper amount of transmission overlap to prevent disruptions beyond the 100 msec threshold.

The method described above for transferring media streams may be repeated multiple times across multiple networked rendering devices, independent of network type or networked rendering device. In one embodiment, playback on the source device continues after playback begins on the destination device, and the playback on the destination device is synchronized to the playback on the source device. A user may thus use multiple devices in, e.g., separate rooms, to play back the same media content.

In some embodiments, the rendering devices involved in the transfer of media are not equally capable of rendering the media at the same level of fidelity or quality (e.g., Device (X) is capable only of standard-definition audio while Device (Y) is capable of high-definition audio). In these embodiments, the target rendering device applies an appropriate transcoding or transformation of the streamed data for compatibility purposes. For example, the audio may be decoded from its original compressed format to Linear PCM (LPCM), and then re-compressed into a new format than can be easily received by the target rendering device. Alternatively or in addition, the media server may perform the required transcoding or transformation of the streamed data at the server side (at, e.g., a Windows 7-based PC). The session context information may contain the necessary data for the target rendering device to determine which node performs the transcoding or transformation of the streamed data.

Figure 2:
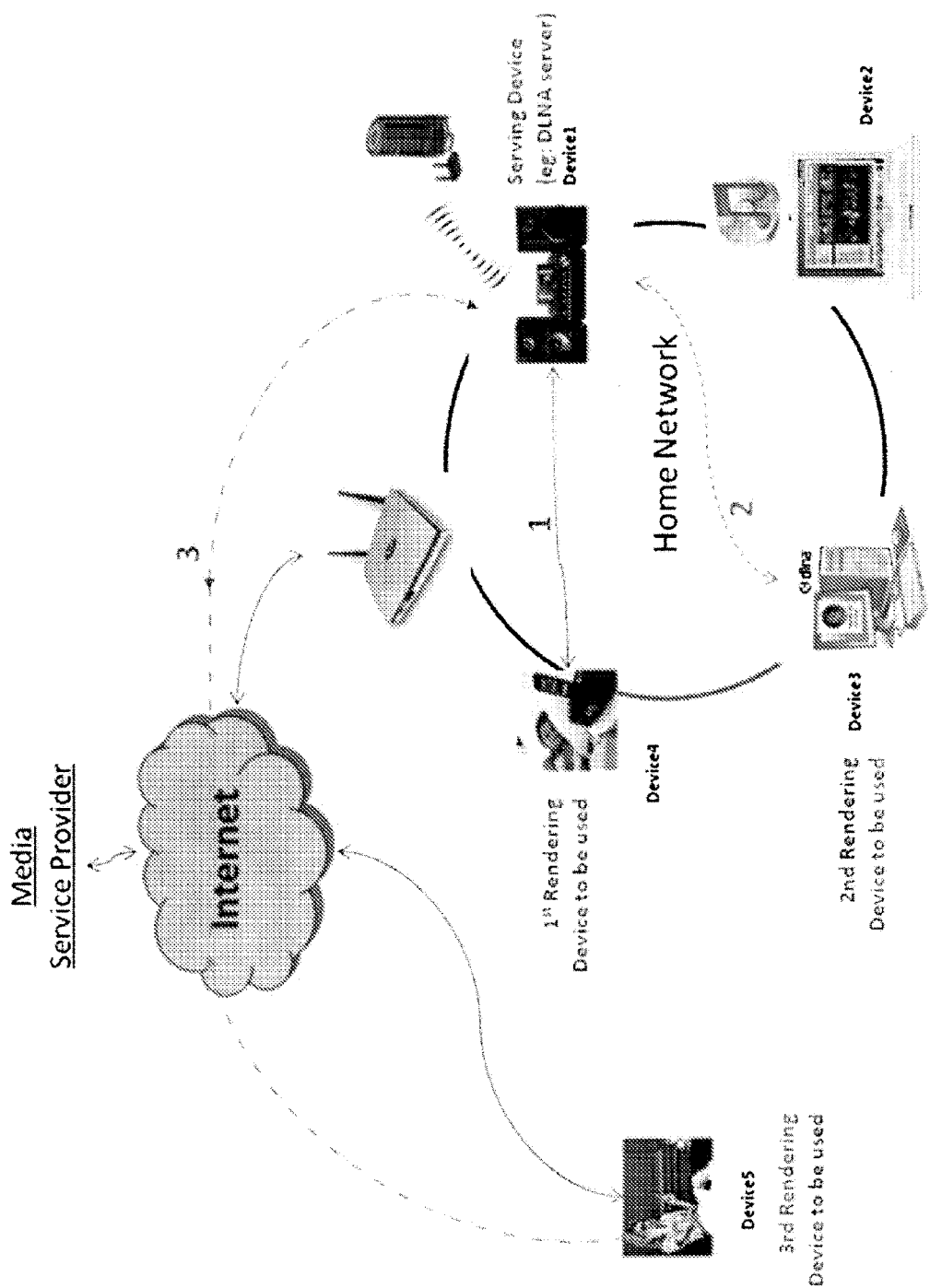
FIG. 2 illustrates a networked media in accordance with various embodiments of the invention.

FIG. 2 shows one embodiment for the proposed system and architecture. In this embodiment, all five devices depicted in the figure are aware of each other's presence and service capabilities through the above-described discovery protocols (digital living network alliance "DLNA" and Bonjour, for example). Each device may have dissimilar protocols for communication with each other. As an illustrative example, Device1 is a DLNA media server and player; Device2 is an Apple Macintosh computer using Bonjour communication protocols; Device3 is a uPnP/DLNA Windows PC; and Device4 is a networked CE device using simple TCP/IP communication protocols. In this example, Device4 is the first device to be connected to the server and render the streaming media. The technology in the rendering device may resolve the protocol discrepancies and may be able to communicate with other devices or servers using multiple protocol technologies. The user then decides to seamlessly transfer the media streaming session from Device4 to Device3 (i.e., the Windows PC). Through the methods described above, the media stream is seamlessly transferred in less than approximately two seconds to Device3 and no media interruptions occur for the user. The overlap of data can be longer or shorter, however, as the system adapts the overlap based the information exchanged during the node and service discovery procedure.

In another example, the user may leave the home network and seamlessly transfer the streaming media to Device5, a portable device (e.g., a cell phone), on a different network than the home network, using the same process described above. In this case, the discovery and communication protocols may be communicated over the Internet and/or a cellular data network. The format and coding of the streamed data may be matched to the portable device capability as described above (e.g., reduced to reflect the lesser bandwidth and/or audio capabilities of the portable device). One scenario where the rendering occurs on the same device but over different networks is where a cell phone is available on a local area network and the control protocols involved in discovery and switching operate over the LAN. When the cell phone is the range of the home network the LAN may be used for streaming. Later when it moves away from the home—the streaming may be accomplished over the cellular network. Alternatively, the rendering device needs to collaborate with the media server—and identify the portable device using a phone number instead of the usual logical name.

Figure 3B:
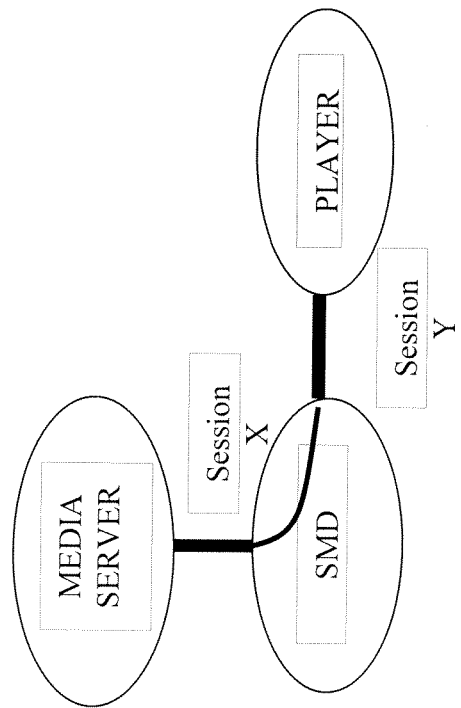
FIGS. 3A and 3B illustrate the transmission of a media stream among components of a networked media system according to various embodiments of the invention.
Figure 3A:
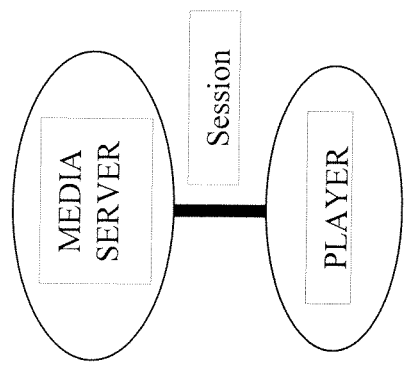
Figure 4:
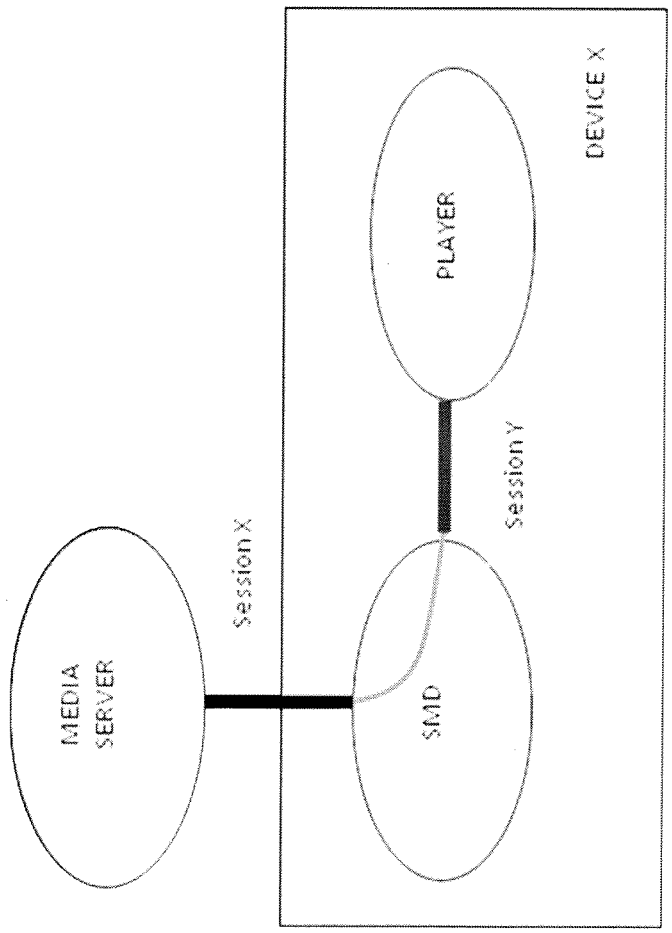
FIG. 4 illustrates a networked media system in which multiple components of the media system reside on one device according to various embodiments of the invention.

As described above, transferring a media stream in a traditional TCP/IP networking system (such as the prior-art system shown in FIG. 3A) may not be seamless. In such a system, a media server sends a stream to a rendering device (e.g., a media player) and is involved in transfer of a session from one rendering device to another. In one embodiment of the present invention as shown in FIG. 3B, a mediation entity, referred to as 'Streaming Media Director' (SMD), receives a stream from a media server. A streaming session may include two sessions, shown as Session X and Session Y in FIG. 3B, wherein the SMD relays the information from one connection to another connection. FIG. 4 illustrates a system in which Device X establishes a streaming session with the media server wherein the SMD and the player are be co-located in Device X.

Figure 5:
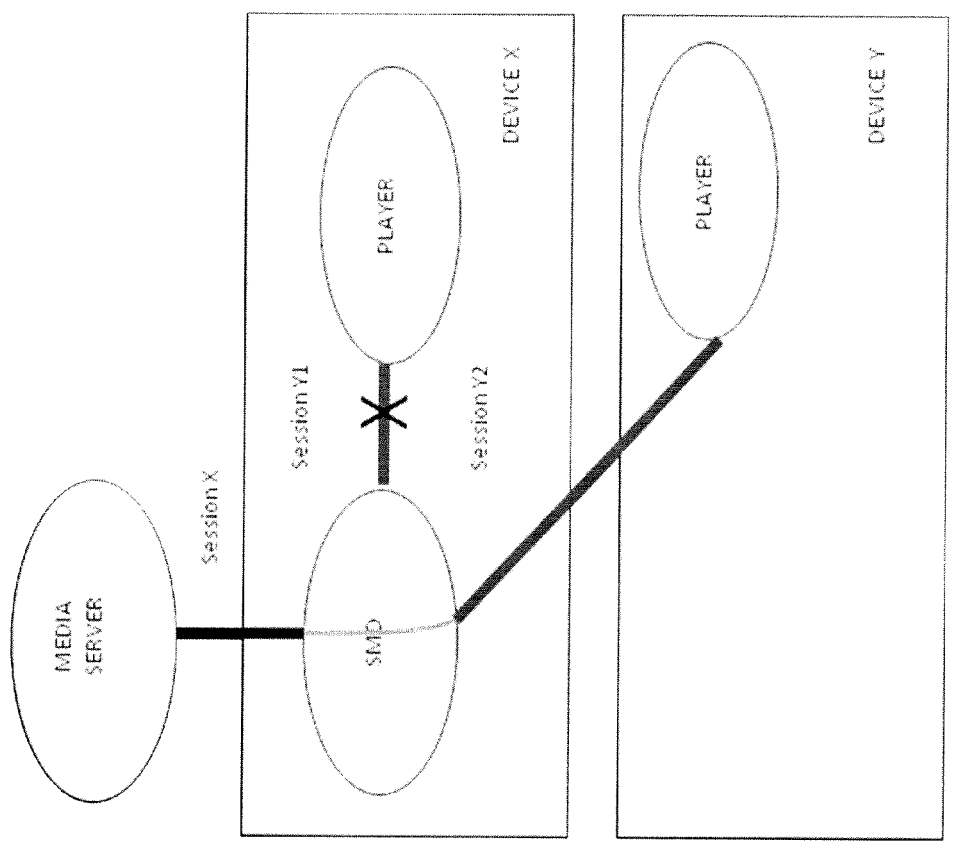
FIG. 5 illustrates a networked media system in which media streams are transferred from one device to another according to various embodiments of the invention.

FIG. 5 illustrates a system in which the streaming session is transferred from Device X to Device Y. The SMD may create a new session (Session Y2) with the player in Device Y. Contents flowing through Session X may now be directed to Session Y2. Session Y1 with the player in Device X may be terminated. The streaming media may traverse the network twice: once from the media server to Device X and then from Device X to Device Y.

Figure 6:
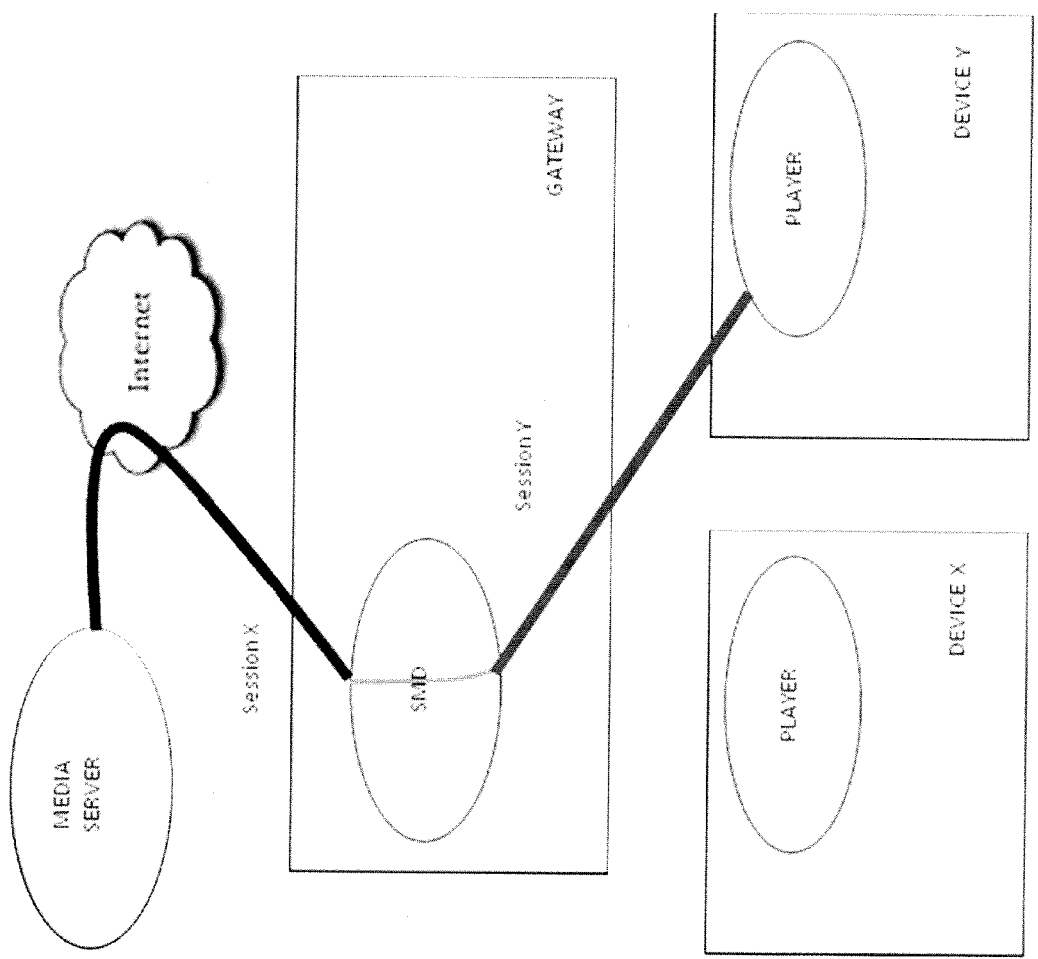
FIG. 6 illustrates another embodiment of networked media system in which media streams are transferred from one device to another according to various embodiments of the invention.

FIG. 6 illustrates an embodiment in which the SMD is implemented in a Gateway device (e.g., a network device such as a router or switch or a general-purpose computer running a gateway application). The network bandwidth may be conserved because the stream need not travel through Device X to reach Device Y. In one embodiment, Device X and Device Y are part of the same home network. In another embodiment, the SMD and the media server are implemented in the same node/system.

While the invention has been particularly shown and described with reference to specific embodiments, it will be understood by those skilled in the art that various changes in form and detail may be made therein without departing from the spirit and scope of the invention as defined by the appended claims. The scope of the invention is thus indicated by the appended claims and all changes that come within the meaning and range of equivalency of the claims are therefore intended to be embraced.

What is claimed is:

1. A method for transferring a rendering of media from a first rendering device to a second rendering device based on media transmitted from a media provider, the method comprising:

providing a network location of the second rendering device;

providing a session context pertaining to a network connection between the first rendering device and the media provider to the said second rendering device;

establishing a network connection between the media provider and the second rendering device based on the network location and the session context;

determining a desired transmission duplication of the media to prevent substantial interruption of the rendering of the media based on information obtained during a node and service discovery procedure;

transmitting the desired transmission duplication of the media from the media provider to the first rendering device and the second rendering device; and continuing transmission of the media from the media provider to the second rendering device.

2. The method of claim 1 wherein the provision of the network location of the second rendering device is provided from the first rendering device.

3. The method of claim 2 wherein the provision of the network location of the second rendering device is provided from the first rendering device in response to a trigger event.

4. The method of claim 1 further comprising stopping transmission of the media from the media provider to the first rendering device after transmission of at the desired transmission duplication of the media.

5. A system, comprising:
a media provider;
a first rendering device comprising a processor coupled to a memory;
a second rendering device comprising a processor coupled to a memory;
wherein the first rendering device is configured to provide a network location of the second rendering device; and to provide a session context pertaining to a network connection between the first rendering device and the media provider to the said second rendering device;
wherein the media provider is configured
to establish a network connection between the media provider and the second rendering device based on the network location and the session context;
to determine a desired transmission duplication of the media to prevent substantial interruption of the rendering of the media based on information obtained during a node and service discovery procedure;
to transmit the desired transmission duplication of the media from the media provider to the first rendering device and the second rendering device; and
to continue transmission of the media from the media provider to the second rendering device.

6. The system of claim 5, wherein the first rendering device is further configured to provide the network location of the second rendering device in response to a trigger event.

7. The system of claim 5, wherein the media server is further configured to stop transmission of the media from the media provider to the first rendering device after transmission of the desired transmission duplication of the media.

8. A method for providing media, the method comprising:
receiving a service request from a first rendering device to establish a service connection;
transmitting media to the first rendering device;
receiving a request to transfer a rendering of the media from the first rendering device to a second rendering device;
establishing a network connection between a media provider and the second rendering device based on a network location and a session context provided to the second rendering device, the session context pertaining to the network connection between the first rendering device and the media provider;

determining a desired transmission duplication of the media to prevent substantial interruption of the rendering of the media based on information obtained during a node and service discovery procedure;

transmitting the desired transmission duplication of the media from the media provider to the first rendering device and the second rendering device; and continuing transmission of the media from the media provider to the second rendering device.

9. The method of claim 8, further comprising stopping transmission of the media from the media provider to the first rendering device after transmission of the desired transmission duplication of the media.

10. A media provider, comprising:
a module stored in a memory and executed by a processor, configured
for receiving a service request from a first rendering device to establish a service connection;
for transmitting media to the first rendering device;
for receiving a request to transfer a rendering of the media from the first rendering device to a second rendering device;
for establishing a network connection between the media provider and the second rendering device based on a network location and a session context provided to the second rendering device, the session context pertaining to the network connection between the first rendering device and the media provider;
for determining a desired transmission duplication of the media to prevent substantial interruption of the rendering of the media based on information obtained during a node and service discovery procedure;
for transmitting the desired transmission duplication of the media from the media provider to the first rendering device and the second rendering device; and
for continuing transmission of the media from the media provider to the second rendering device.

11. The media provider according to claim 10, further configured: for stopping transmission of the media from the media provider to the first rendering device after transmission of the desired transmission duplication of the media.

12. The media provider according to claim 10, further configured: for receiving a media stream from a media server.

13. The media provider according to claim 10, wherein the media provider is co-located in the first rendering device.

14. The media provider according to claim 10, wherein the media provider is located in a Gateway device.

15. A computer program product comprising a non-transitory medium storing program instructions which are computer-executable to implement the following steps:
receiving a service request from a first rendering device to establish a service connection;
transmitting media to the first rendering device;
receiving a request to transfer a rendering of the media from the first rendering device to a second rendering device;
establishing a network connection between a media provider and the second rendering device based on a network location and a session context provided to the second rendering device, the session context pertaining to the network connection between the first rendering device and the media provider;

determining a desired transmission duplication of the media to prevent substantial interruption of the rendering of the media based on information obtained during a node and service discovery procedure;

transmitting the desired transmission duplication of the media from the media provider to the first rendering device and the second rendering device; and continuing transmission of the media from the media provider to the second rendering device.

16. The computer program product of claim 15, further comprising stopping transmission of the media from the media provider to the first rendering device after transmission of the desired transmission duplication of the media.

\* \* \* \* \*